United States Patent
Huang et al.

(10) Patent No.: US 9,363,444 B2
(45) Date of Patent: Jun. 7, 2016

(54) BACKGROUND MODEL UPDATE METHOD FOR IMAGE PROCESS

(71) Applicants: Yu-Hao Huang, Hsin-Chu (TW);
En-Feng Hsu, Hsin-Chu (TW);
Ming-Tsan Kao, Hsin-Chu (TW);
Meng-Huan Hsieh, Hsin-Chu (TW)

(72) Inventors: Yu-Hao Huang, Hsin-Chu (TW);
En-Feng Hsu, Hsin-Chu (TW);
Ming-Tsan Kao, Hsin-Chu (TW);
Meng-Huan Hsieh, Hsin-Chu (TW)

(73) Assignee: PIXART IMAGING INCORPORATION, Hsin-Chu (TW)

( * ) Notice: Subject to any disclaimer, the term of this patent is extended or adjusted under 35 U.S.C. 154(b) by 444 days.

(21) Appl. No.: 13/865,680

(22) Filed: Apr. 18, 2013

(65) Prior Publication Data

US 2013/0342705 A1    Dec. 26, 2013

(30) Foreign Application Priority Data

Jun. 20, 2012 (TW) .............................. 101121986 A

(51) Int. Cl.
*H04N 5/235* (2006.01)
*G06K 9/00* (2006.01)
*G06T 7/00* (2006.01)
*G06T 7/20* (2006.01)

(52) U.S. Cl.
CPC .......... *H04N 5/2351* (2013.01); *G06K 9/00382* (2013.01); *G06T 7/0081* (2013.01); *G06T 7/2053* (2013.01); *G06T 2200/28* (2013.01); *G06T 2207/20081* (2013.01); *G06T 2207/20144* (2013.01); *G06T 2207/30196* (2013.01)

(58) Field of Classification Search
CPC  G06T 7/0081; G06T 7/2053; G06K 9/00382; H04N 5/2351
See application file for complete search history.

(56) References Cited

U.S. PATENT DOCUMENTS

| | | | |
|---|---|---|---|
| 2009/0087025 A1* | 4/2009 | Ma ................................ | 382/103 |
| 2009/0297023 A1* | 12/2009 | Lipton et al. .................. | 382/164 |
| 2013/0051613 A1* | 2/2013 | Bobbitt et al. ................ | 382/103 |
| 2013/0084006 A1* | 4/2013 | Zhang et al. .................. | 382/173 |
| 2013/0170557 A1* | 7/2013 | Wang et al. .............. | 375/240.24 |

* cited by examiner

*Primary Examiner* — Jefferey Harold
*Assistant Examiner* — Sean Haiem
(74) *Attorney, Agent, or Firm* — Tung & Associates

(57) ABSTRACT

The present invention relates to a background model update method for image process. The accuracy of distinguishing a foreground image from the background model can be improved by adjusting the background model update level according to image variations such as brightness variation, motion variation, color variation, etc.

2 Claims, 3 Drawing Sheets

BACKGROUND MODEL UPDATE METHOD FOR IMAGE PROCESS

CROSS REFERENCE

The present invention claims priority to TW 101121986, filed on Jun. 20, 2012.

BACKGROUND OF THE INVENTION

1. Field of Invention

The present invention relates to a background model update method, especially a method capable of dynamically adjusting background model update time or level. The accuracy of distinguishing a foreground image from the background model can be improved by adjusting the background model update time or weighting according to image variations such as brightness variation, motion variation, color variation, etc.

2. Description of Related Art

Current image sensing chip utilizes an image sensor to retrieve the light projected from an active light source and reflected by an object (such as a touch pen or a finger). The image sensing chip can generate object data according to the reflected light retrieved by the image sensor, wherein the object data for example include the brightness of the object and the gravity center position of the object relative to the image sensing chip, and a gesture or a motion of the object can be determined according to the object data. However, when the difference between the reflected light and the background image is too little and difficult to distinguish, a misjudgment usually happens.

For example, when a user wears a cloth with high reflection coefficient and enters a detection region of the image sensor, a bright and steady background image is formed in the image sensor. Thus, if the user waves his/her fingers/palm to produce a gesture for some control command, the brightness difference between the reflected fingers/palm image and the background image could be very little, and the gesture can very easily be misjudged due to such little difference.

Therefore, the present invention provides a method to update the background model by taking the environment and the action of a user into consideration; the image sensor can change the background model update time to improve the accuracy of distinguishing the foreground image from the background model according to a judgment on the user's action.

SUMMARY OF THE INVENTION

The present invention provides a background model update method for image process, wherein the method reduces a level of updating the background model by taking the environment and the action of a user into consideration, to improve the accuracy of distinguishing a foreground image from the background model. Reducing the level of updating the background model update level can be achieved by prolonging the background model update time or reducing the weighting of a new image as a component for updating the background model.

To achieve one or more of the above and other objectives, when the image sensor senses a new image with a brightness higher than the background model, the background model update time can be prolonged or the weighting of the new image as a component for updating the background model can be reduced, and when a new image no more includes such high brightness pixel(s), the background model update time or the weighting of the new image can be reverted back to normal. Usually, the position of an object (such as the user's fingers or palm) is closer to the image sensor than the background environment, and therefore the brightness of the light reflected by the object is higher, so the new image including the object is brighter; thus, prolonging the background model update time or reducing the weighting of the new image can make the background model to be more consistent as a comparison basis to be compared with the new image, and the accuracy of distinguishing the foreground image in the new image from the background model can be improved.

The present invention also provides another embodiment, wherein if the image sensor detects a new image which indicates a movement of an object, the background model update time can be prolonged or the weighting of the new image as a component for updating the background model can be reduced, and when a new image no more includes such high brightness pixel(s), the background model update time or the weighting of the new image can be reverted back to normal. Usually, when a user waves the object (such as the user's fingers or palm) to produce a gesture, there is an obvious movement, and therefore the new image should include information of the movement. Thus, the background model update time can be prolonged or the weighting of the new image as a component for updating the background model can be reduced accordingly.

The present invention also provides another embodiment, wherein if the image sensor detects a new image which includes an object with a predetermined appearance feature, the background model update time can be prolonged or the weighting of the new image for background model update can be reduced. For example, in a detection region of the image sensor, a distinguishable object can be predetermined, such as but not limited to the user's fingers or palm. In general, an adults' fingers and palm together have a size roughly about twenty-some centimeters square, and the color thereof varies from white to dark color. Criteria to determine whether such an object exists can be predetermined, such as color and size, and the image sensor can make a judgment accordingly to to determine whether a new image includes such appearance features. If yes, the background model update time can be prolonged or the weighting of the new image for background model update can be reduced.

The aforementioned methods to reduce the update level of the background model can be implemented alone or in combination, to promote the effect of the present invention.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustrative purpose only, but not drawn according to actual scale, wherein the parts not relevant to the essence of the present invention are omitted. The embodiments are for illustrative purpose, but not for limiting the scope of the invention.

Figure 1A:
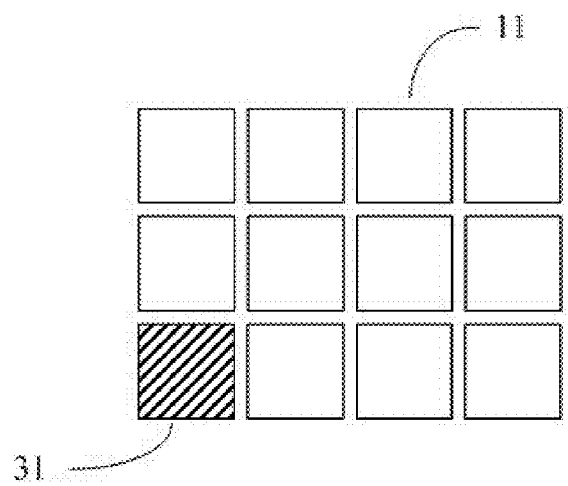
FIGS. 1a and 1b are schematic views showing a new image and how a background model is updated according to the present invention.
Figure 1B:
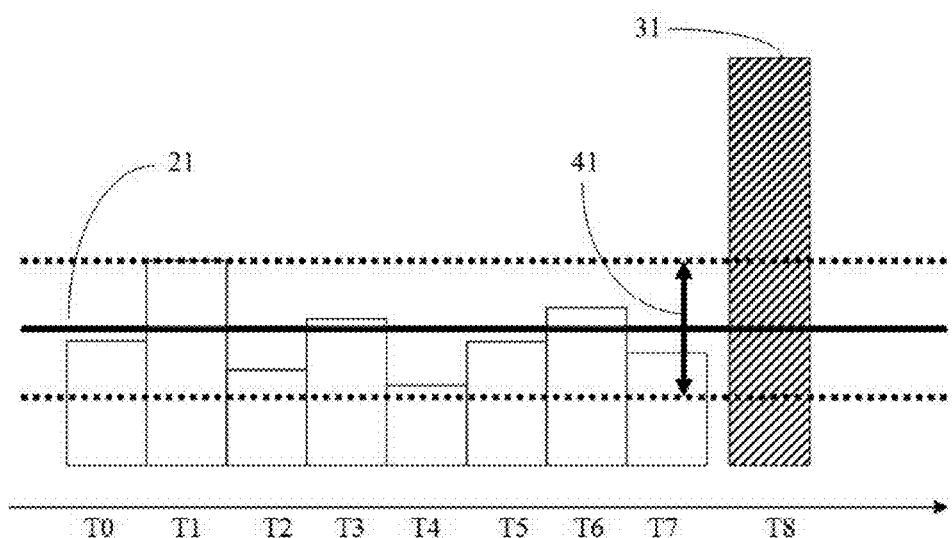

FIGS. 1a and 1b are schematic views showing a new image and how a background model is updated according to the present invention. The figures show that an object is sensed by the image sensor to generate a new image 11 which includes a brighter pixel 31, and the present invention is applied to processing it. In this embodiment, the new image 11 includes 12 pixels (4×3 pixels), wherein the brighter pixel 31 has a higher brightness. FIG. 1b shows the brightness variation, wherein the vertical axis is the brightness at the position of pixel 31 and the horizontal axis time, i.e., the brightness at time T8 is the brightness of the pixel 31 in the new image, and the brightness at time T0-T7 are the brightness at the position of pixel 31 in the previous images. Note that what are shown by the figures are for illustrative purpose only; the pixel number in an actual image sensor is usually more, such as 30 pixels×30 pixels.

An average brightness 21 and a standard deviation region 41 of the pixel 31 can be obtained from the brightness data from time T0 to time T7. At time T8, the brightness of pixel 31 exceeds the standard deviation region 41 and presents a high brightness status, which indicates that the object enters the detection region of the image sensor so that the new image 11 begins to include one or more high brightness pixels. In this embodiment, it is assumed that the new image 11 is used as a component to update the background model.

In general, there are two types of methods to update the background model: progressive image update and single image update. The progressive image update method progressively updates the background model according to previous image data; the single image update method directly takes an image for background model. The method according to the present invention is particularly applicable to progressive image update.

In this embodiment, before time T8, the background model of the pixel 31 has an average brightness 21 and a standard deviation region 41. When the image at time T8 has a higher brightness, the weighting of the image at time T8 can be reduced or the background model update time can be prolonged, to reduce the update level of the background model; in this embodiment, the background model update can skip the image at time T8, i.e., not using the image at time T8 for background model update.

In detail, to reduce the update level of the background model, the weighting of the pixel brightness above the average brightness 21 or out of standard deviation region 41 can be reduced. For example, when updating the background model, the pixel brightness at time T8 can be given a weighting of ⅛ or 1/16, while the original background model can be given a weighting of ⅞ or 15/16, such that the influence of the higher brightness pixel on the background model can be reduced.

Or, when a higher brightness pixel appears, the background model update time can be prolonged. In this embodiment, every image before time T8 is used for updating the background model, but when the higher brightness pixel appears at time T8, the background model update time can be prolonged by e.g. three times or ten times, i.e., one image in every three or ten images are taken as a reference for updating the background model.

The aforementioned methods can be implemented in combination, i.e., when the higher brightness pixel appears at time 18, both the background model update time is prolonged and the weighting of the higher brightness pixel is reduced.

Figure 2:
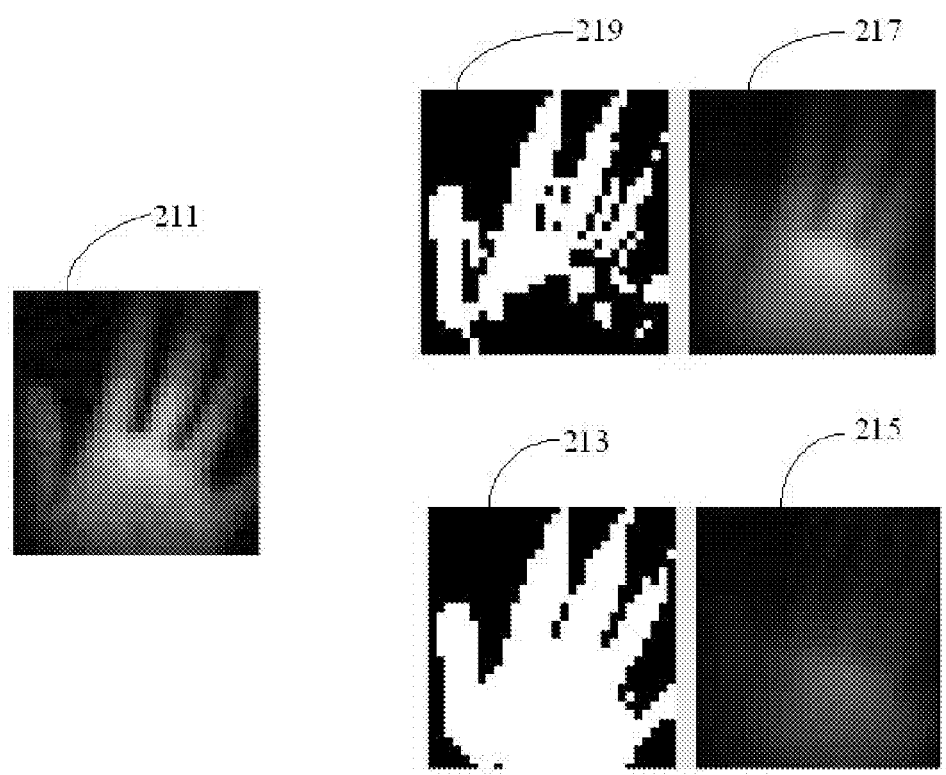
FIG. 2 shows a preferable embodiment according to the present invention.

FIG. 2 shows an embodiment of the present invention. When the new image includes a higher brightness pixel, a better foreground image can be obtained by reducing the weighting of the new image for updating the background model or by prolonging the background model update time.

The image 211 is a new image, which includes many pixels having brightness exceeding a predetermined difference value over the background model brightness. The image 217 is the background model obtained by adding the image 211 into the original background model after retrieving the image 211; for example, the weighting of the image 211 is ½, and the weighting of the original background model is ½. The image 215 is the background model obtained by reducing or ignoring the influence of the image 211; In comparison with the image 217, the image 215 is dimmer and more blurred. The above shows a result as the user's fingers/palm enters the detection region of the image sensor.

The image 213 shows the difference between the new image 211 and the background model 215. In this embodiment, the image 213 is obtained by subtracting the image 215 from image 211, and after subtraction, a pixel in the image 211 with a brightness difference higher than a first predetermined value, and the pixel itself having a brightness higher than a second predetermined value, is set as a high brightness pixel; pixels which do not meet the above requirements are set as low brightness pixels. In other embodiments, more predetermined values can be set to distinguish more brightness differences. For example, multiple predetermined values can be set; a pixel with a brightness difference higher than a first predetermined value, and the pixel itself having a brightness higher than a second predetermined value can be set as a high brightness pixel; a pixel with a brightness difference between the first predetermined value and a third predetermined value, and the pixel itself having a brightness higher than a second predetermined value, can be set as a medium brightness pixel. After updating the background model, there are many methods to process the difference between the new image and the background model, all of which can be used in combination with the method of the present invention.

The image 219 is obtained after subtracting the image 217 from the image 211. By comparing the images 213 and 215 with the images 217 and 219, it can be found that when the background model update level is reduced, that is, when the image 215 is less clear than the image 217, the fingers and the palm are clearer and more distinguishable in the image 213, and the resolution to distinguish the foreground image from the background model is improved. In contrast, after the user's fingers/palm leaves the detection region of the image sensor, the image retrieved by the image sensor no more includes the image of the fingers/palm. In this case, the background model update can be reverted to a normal background model update mode, that is, a background update mode having a relatively quicker update time or giving a normal weighting to the new image, in response to the actual situation that the user is not in control.

Figure 3:
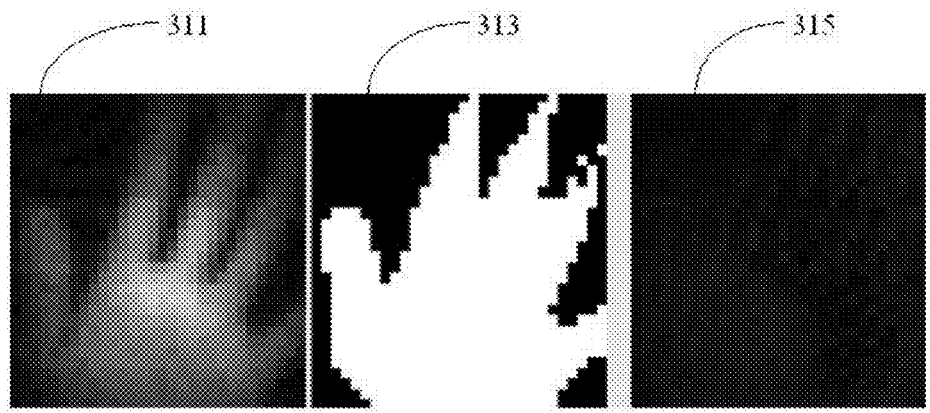
FIG. 3 shows another preferable embodiment according to the present invention.

Similarly, FIG. 3 shows another embodiment of the present invention. When the image sensor senses a new image which includes an object with a predetermined appearance feature (fingers/palm in this embodiment), the background model update time can be prolonged or the weighting of the new image for background model update can be reduced, and when a new image no more includes such an object, the background model update time or the weighting of the new image can be reverted back to normal.

In comparison with the aforementioned embodiment, this embodiment is different in that the image sensor chip makes a judgment as to whether the new image includes an object having a predetermined appearance feature (user's fingers/palm in this embodiment). As the image sensor chip determines that the new image 311 includes the fingers/palm image feature, it reduces the background model update level. The image 315 represents the background model after update, and the image 313 is obtained by subtracting the image 315 from the image 311. The image 313 can be used in a subsequent process such as for activating a control command. In comparison with the image 219 shown in FIG. 2, it can be clearly seen that the fingers/palm is even clearer in the image 313; the resolution to distinguish the foreground image from the background model is improved.

Figure 4:
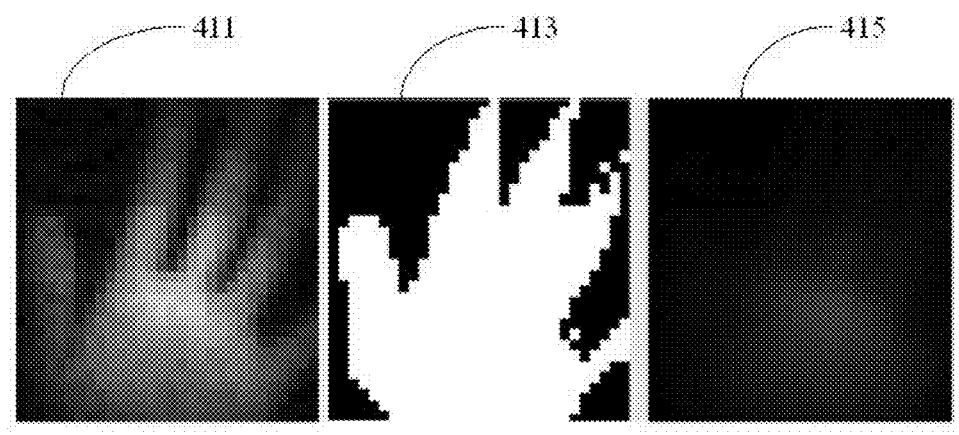
FIG. 4 shows yet another preferable embodiment according to the present invention.

FIG. 4 shows another embodiment of the present invention. In comparison with the aforementioned embodiments, this embodiment is different in that the image sensor chip makes a judgment as to whether the new image shows a movement of the object. The fingers/palm appears in the image 411 and a movement of the object can be calculated, and because there is a movement of the object, the background model update time can be prolonged or the weighting of the new image for background model update can be reduced, and when a new image no more includes such an object, the background model update time or the weighting of the new image can be reverted back to normal. Thereby, an image 415 is obtained which represents a background model after update, and an image 413 is obtained by subtracting the image 415 from the image 411, which can be used for subsequent process. In comparison with the image 219 shown in FIG. 2, it can be clearly seen that the fingers/palm is even clearer in the image 313; the resolution to distinguish the foreground image from the background model is improved.

According to the above, the background model update for image process of the present invention can improve the accuracy of distinguishing foreground image from background model by reducing a level of updating the background model.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. An embodiment or a claim of the present invention does not need to achieve all the objectives or advantages of the present invention. The title and abstract are provided for assisting searches but not for limiting the scope of the present invention.

What is claimed is:

1. A background model update method for an image sensing chip including an image sensor, comprising:
   determining whether an object enters a detection region of the image sensor, wherein the detection region is a three-dimensional space; and
   when it is determined that the object enters the detection region of the image sensor and at least one of the following judgments is determined yes:
   (1) that the object includes a plurality of pixels having brightness exceeding a predetermined difference value over the background model brightness;
   (2) that the object has a predetermined appearance feature; or
   (3) that the object shows a movement, reducing a level of updating a background model, whereby an accuracy to distinguish a foreground image in a new image sensed by the image sensor is increased;
   wherein the step of reducing the level of updating the background model includes: prolonging an update time of the background model.

2. The background model update method according to claim 1, wherein the step of reducing the level of updating the background model further includes: reducing a weighting of the new image as a component for updating background model.

* * * * *